US011320884B2

(12) United States Patent
Liang et al.

(10) Patent No.: US 11,320,884 B2
(45) Date of Patent: May 3, 2022

(54) LIMITING COMPUTING RACK INPUT POWER DUE TO POWER SUPPLY UNIT FAILURE

(71) Applicant: INTEL CORPORATION, Santa Clara, CA (US)

(72) Inventors: Xiaoguo Liang, Shanghai (CN); Haifeng Gong, Shanghai (CN); Wenhui Shu, Shanghai (CN); Chuan Song, Shanghai (CN); Xiang Zhou, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 80 days.

(21) Appl. No.: 16/967,091

(22) PCT Filed: Jul. 20, 2018

(86) PCT No.: PCT/CN2018/096408
§ 371 (c)(1),
(2) Date: Aug. 3, 2020

(87) PCT Pub. No.: WO2020/014952
PCT Pub. Date: Jan. 23, 2020

(65) Prior Publication Data
US 2021/0068292 A1 Mar. 4, 2021

(51) Int. Cl.
*G06F 1/30* (2006.01)
*G06F 1/3206* (2019.01)
*H04J 3/16* (2006.01)

(52) U.S. Cl.
CPC ........... *G06F 1/3206* (2013.01); *H04J 3/16* (2013.01)

(58) Field of Classification Search
CPC ............... G06F 1/28; G06F 1/30; G06F 1/32
See application file for complete search history.

(56) References Cited

U.S. PATENT DOCUMENTS

| 2009/0164806 A1* | 6/2009 | Dishman | G06F 1/26 |
| | | | 713/300 |
| 2011/0068625 A1* | 3/2011 | Duan | G06F 11/2015 |
| | | | 307/29 |
| 2011/0133560 A1 | 9/2011 | Yamashita et al. | |

FOREIGN PATENT DOCUMENTS

| WO | 2007076628 A1 | 7/2007 |
| WO | 2013056578 A1 | 4/2013 |

(Continued)

OTHER PUBLICATIONS

International Search Report for Related PCT Application PCT/CN2018/096408, dated Mar. 18, 2019, 4 pages.

*Primary Examiner* — Paul B Yanchus, III
(74) *Attorney, Agent, or Firm* — Schwabe, Williamson & Wyatt, P.C.

(57) ABSTRACT

In some examples, a control unit is configured to control a computer server rack having a first grid power source, a second grid power source, and a battery backup system. The control unit is adapted to monitor a failed status of one or more power supply units in the computer server rack, to determine location information relating to the one or more power supply units having the failed status, to determine input power of the one or more power supply units having the failed status, to adjust an input power of the first grid power source based on the determined input power, and to adjust an input power of the second grid power source based on the determined input power.

25 Claims, 8 Drawing Sheets

(56) References Cited

FOREIGN PATENT DOCUMENTS

| WO | 2019019163 | 1/2019 |
| WO | 2019019163 A1 | 1/2019 |

\* cited by examiner

400

LIMITING COMPUTING RACK INPUT POWER DUE TO POWER SUPPLY UNIT FAILURE

CROSS REFERENCE TO RELATED APPLICATIONS

Pursuant to 35 U.S.C. § 371, this application is the United States National Stage Application of International Patent Application No. PCT/CN2018/096408, filed on Jul. 20, 2018, the contents of which are incorporated by reference as if set forth in their entirety herein.

RELATED APPLICATION

This application is related to International PCT patent application PCT/CN2017/094941, filed on Jul. 28, 2017 and entitled "Smart Battery Backup System to Increase Rack Density of IDC".

TECHNICAL FIELD

This disclosure relates generally to limiting an input power to a computer rack (for example, such as a server rack) during failure of one or more power supply unit (PSU).

BACKGROUND

The growth of very large data centers has resulted in so-called 'server farms' which may contain thousands or tens of thousands of computer servers. To make efficient use of space, the servers are typically arranged in standardized 19" wide racks, each rack housing multiple servers, with many racks in a room or building, or in multiple rooms or buildings, for example. The installed base of server racks is already enormous, with hundreds of thousands, or possibly millions of racks in place. Each rack may be limited to a defined peak power because of its power budget set from the Internet Data Center (IDC) level. IDC upgrade progress is far behind that of the servers and racks, so that many of today's racks still have to be deployed in IDCs that were built years ago with the limitations of that era. Utilization of the rack space is typically low because the racks themselves, and the grid power allocated to each rack by the IDC, were designed in a previous era with earlier technology. Further, the servers may require extra power (beyond their long-term steady state value) that lasts for time periods from tens of seconds to several hours. Covering this need by providing increased grid power to the racks is impractical because of the very large installed base of power sources and racks and other existing infrastructure in an IDC.

Within a rack, the allocated power may typically be large enough to handle temporary surges in power (above the average power consumption) demanded by the servers in that rack, as long as those surges don't last more than a defined period of time. Exceeding this defined period of time may cause harmful results, such as emergency computer shutdown or even thermal damage. Therefore, the number of servers in the rack may be intentionally kept low to avoid overstressing the power system when extra power is demanded by the servers.

Battery backup systems (BBS) are typically used to provide an Uninterruptable Power Supply (or Uninterruptible Power Source, or UPS) function, where the battery is used to provide power only when the main power source is lost (for example, failure of grid power to a building housing a server farm). In such cases, the BBS may be kept fully charged while grid power is available, to maximize the length of time the BBS can subsequently survive a grid outage. However, the BBS typically does not supplement the grid power when the grid power is available.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Some embodiments relate to battery backup systems (BBS) that are able to increase rack density by managing power control (for example, to increase server rack density in Internet Data Centers).

In some embodiments, a battery backup system (BBS) and/or a smart battery backup system (smart BBS) may be used to help increase rack density of an Internet Data Center (IDC) with a low total rack power budget limit. A BBS can be used in a server rack system to extend usage beyond merely providing backup power during AC power failure (for example, Uninterruptible Power Supply, Uninterruptible Power Source, and/or UPS) to the ability of supplementing extra peak power of the rack, which can be implemented even during daily normal operation. In some embodiments, rack total input power can be limited to a preset level under a servers dynamic power/workload change, for example, and more servers can be used. Rack density may be increased using a BBS. In some embodiments, a smart BBS turbo rack can be used to increase rack density and/or to use more high thermal design power (TDP) central processing units (CPUs).

In some embodiments, two or more power supply units (PSUs) are included in each server, and total server power is evenly balanced. In some embodiments, additional functionality may be used to deal with an imbalanced load when one of the PSUs fails. PSU failure can occur due to a variety of situations, and can be a frequent occurring event in an Internet Data Center (IDC) rack. As a result, redundant PSUs are used in some embodiments. For example, in some embodiments, two or more PSUs are included in each server in a rack. In some embodiments, two PSUs are included in each rack to provide a redundant PSU in case one of the two PSUs fails. Failure of a PSU can occur, for example, for a number of reasons. For example, PSU failure can occur from aging of components inside the PSU. PSU failure can be indicated due to protection circuits operating inside the PSU, for example. For example, PSU failure can occur in response to over current protection (OCP), over voltage protection (OVP), over temperature protection (OTP), etc. Another cause of PSU failure can be, for example, due to an imbalanced work load between two PSUs in a server that causes one of the two PSUs to age faster than the other.

In some embodiments, when one or more PSU fails, a failure indicator and/or failure information relating to a location of the failed PSU may be used to adjust a BBS input power limit to maintain a total input power limit of a computing rack. A power adjustment factor may be used to reset or re-adjust an input power limit. The power adjustment factor can be based on a last report of input power data of one or more PSUs before failure thereof.

Figure 1:
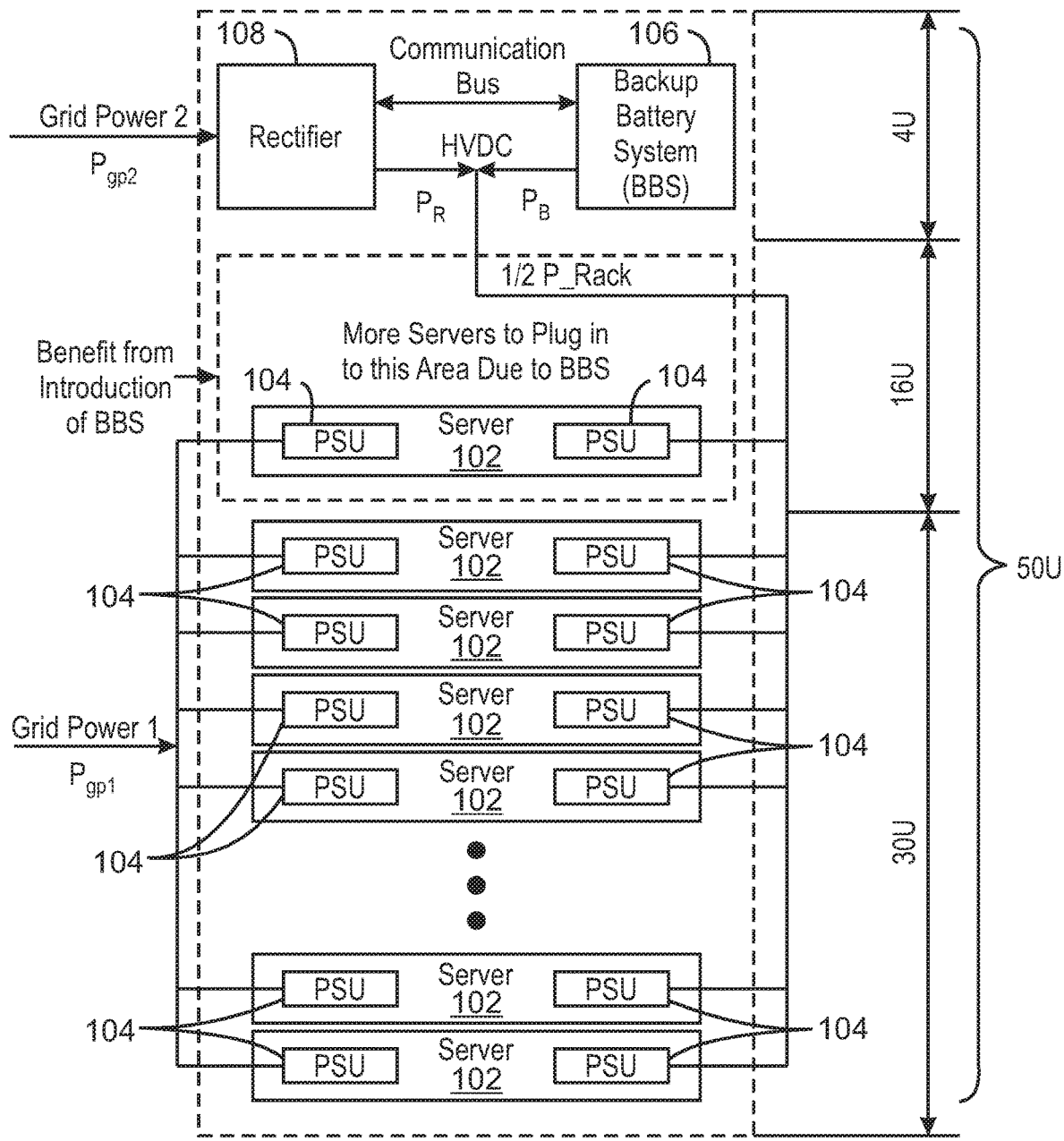
FIG. 1 illustrates a computer rack in accordance with some embodiments.

FIG. 1 illustrates a system 100 in accordance with some embodiments. In some embodiments, system 100 relates to a computer rack (for example, a server rack). In some embodiments, system 100 relates to a server rack in an Internet Data Center (IDC). System 100 can include any number of servers 102. As illustrated in FIG. 1, each server 102 includes two power supply units (PSUs) 104. However, in some embodiments, each server 102 can include more than two power supply units 104. In some embodiments, system 100 is a rack with a 19 inch horizontal dimension, which has been common in the computer world for decades, but other dimensions may be used in some embodiments. The rack is also shown with a total portion of 50 units (50 U) of vertical mounting space. Although a total mounting space of the rack is illustrated as 50 U in FIG. 1, the mounting space of the rack can be different than 50 U in some embodiments. The 50 units (50 U) of mounting space illustrated in FIG. 1 can include a first portion of 30 units (30 U) in which to mount servers 102, plus an additional second portion of 16 units (16 U) to mount additional servers 102, but other vertical dimensions may be used. For redundancy, each server 102 is shown with two PSUs 104, with each PSU 104 being energized from a separate grid power source (for example, grid power source 1 or grid power source 2). This permits a server 102 to continue operating in the event that one of the PSUs 104, or the grid power source that powers it, should fail. In a typical configuration, each PSU 104 can supply the server with sufficient power to operate when the other PSU 104 in that server 102 fails. But without such failures, each PSU 104 may supply approximately half the power needed by the respective server 102, and the server 102 or PSUs 104 may contain circuitry to balance the load in this manner.

Total power budget for the Internet Data Center (IDC) has been fixed. However, as servers have begun to use more and more power, the total power budget has provided constraints on the system, and some systems have had to use racks with less servers, making less than full use of rack space. As server power use has increased, less and less servers have been included in server racks due to a static overall power budget. This has impacted the total cost of ownership (TCO) of server rack systems. Therefore, in some embodiments, a distributed battery backup system (BBS) can be used to allow inclusion of more servers in the system. Therefore, in some embodiments, a BBS can be included on the rack.

System 100 includes a battery backup system (BBS) 106 and a rectifier 108. In some embodiments, BBS 106 can be used in a server rack system of system 100 to extend usage from being used merely as backup power (for example, Uninterruptible Power Supply, Uninterruptible Power Source, and/or UPS) during AC power failure to also supplement peak power of the rack (for example, during normal daily operation). That is, the BBS 106 can help supply extra peak power requirements during operation of system 100. This can allow more servers 102 to be included in the rack (for example, in the 16 U area of the rack in addition to the 30 U area of the rack). In this manner, in some embodiments, the average power can increase while still maintaining the average power budget. In addition to or instead of allowing for additional servers 102 in the system, higher power central processing units (CPUs) may be used in servers 102 than are possible without use of BBS 106.

In some embodiments, BBS 106 and rectifier 108 are included in a same rack as the servers 102. In some embodiments, BBS 106 and rectifier 108 can be included in a 4 unit (4 U) portion of the rack space of the rack illustrated in FIG. 1, but this size can be different in different embodiments. In some embodiments, Grid Power 1 is shown as a source of power to the rack of servers 102. In some embodiments, Grid Power 1 is a source of alternating current (AC) power to the rack (for example, 220V AC). In some embodiments, Grid Power 1 provides power to the power supply units (PSUs) 104 on the left side of the servers 102 in the rack, as illustrated in FIG. 1. Similarly, Grid Power 2 is shown as a separate source of power to the rack (for example, a separate source of AC power, such as, for example, 220V AC power, to the rack). In some embodiments, Grid Power 2 provides power to the rectifier 108. The rectifier 108 then provides direct current (DC) power to charge up the battery backup system (BBS) 106, and also provides DC power to the PSUs 104 on the right side of the servers 102 in the rack. Rectifier 108 can have output power $P_R$, and BBS 106 can have output power $P_B$. In some embodiments, $P_R$ and $P_B$ can be based on high-voltage direct current (HVDC) architecture. For example, in some embodiments, $P_R$ and $P_B$ can be 240V HVDC output voltage. In some embodiments, a communication bus is provided for communication between BBS 106 and rectifier 108.

The illustrated PSUs 104 may be capable of operating on either AC input voltage or DC input voltage, which allows the rectifier 108 and BBS 106 to be retrofitted into an existing rack without replacing the PSUs 104, for example. However, other embodiments may replace some AC-only PSUs with DC-only or AC/DC PSUs, for example. That is, in some embodiments, some or all of the PSUs 104 may be AC-only PSUs, some or all of the PSUs 104 may be DC-only PSUs, and/or some or all of the PSUs 104 may be AC/DC PSUs.

FIG. 1 illustrates the rectifier 108 and BBS 106 at the top of the rack of system 100. However, other embodiments may place the rectifier 108 and/or BBS 106 in any convenient location. FIG. 1 also illustrates the rectifier 108 and BBS 106 taking up 4 units (4 U) of rack space, leaving 16 units (16 U) of rack space for additional servers 102 and their respective PSUs 104 beyond the other servers 102 and their respective PSUs 104 shown in the 50 unit (50 U) space illustrated in FIG. 1. However, other embodiments may use other numbers of units for these purposes. For clarity, FIG. 1 shows only one additional server 102 in the additional 16 U rack space, but other embodiments may have more than one server 102 in that space. For example, in some embodiments, 30 servers 102 can be included in the first 30 U rack space, and/or in some embodiments 16 servers 102 can be included in the additional 16 U rack space.

For some or all of the descriptions herein, the following may be used:

$P_{gp1}$ can correspond to the actual power provided by Grid Power 1.

$P_{gp2}$ can correspond to the actual power provided by Grid Power 2.

$P_R$ can correspond to the output power of the rectifier 108.

$P_B$ can correspond to the output power of the BBS 106.

$P_{\_rack}$ can correspond to the total input power consumed by the rack (as measured from outside the rack), including $P_{gp1}+P_{gp2}$.

$P_{rack\_limit}$ can correspond to the predetermined maximum input power limit set for the rack without considering the BBS output $P_B$, i.e., the maximum permitted for $P_{gp1}+P_{gp2}$.

P can correspond to ½ (one half) of the amount by which the power consumed by the rack ($P_{\_rack}$) exceeds the predetermined maximum input power limit ($P_{rack\_limit}$).

In some embodiments, each server 102 can automatically balance the amount of power being drawn by its two PSUs 104. Therefore, assuming no failure (for example, assuming no failure such as a failure of a PSU or its power source), $P_{gp1}=\frac{1}{2} P_{\_rack}$. Similarly, $P_R=\frac{1}{2} P_{\_rack}$ under normal operating conditions when the BBS 106 is not contributing power.

In some embodiments, rectifier 108 is a high efficiency rectifier. In some embodiments, $P_{gp2}=\frac{1}{2} P_{\_rack}/u$, where u is the efficiency of the rectifier 108. When the efficiency of the rectifier 108 is 100%, u is equal to 1. Therefore, if the rectifier 108 has 100% efficiency, then $P_{gp2}$ would be equal to the value ½ $P_{\_rack}$. Since the efficiency u of the rectifier may be slightly less than 100% efficiency, (for example, in some embodiments, the efficiency u of rectifier 108 may be 98% or 0.98), $P_{gp2}$ may be slightly greater than $P_R$. But for simplicity of explanation, the subsequent descriptions may assume $P_R=P_{gp2}$. A person of ordinary skill in the art should be able to calculate how much the efficiency of the rectifier affects the descriptions that follow in this document.

In addition to the power amounts just described, BBS 106 may provide output power $P_B$ when such power is called upon by a power control module. Under normal steady state power conditions, Grid power 1 and Grid power 2 may each provide one-half of the rack power needed, with Grid Power 2 first going through a high-efficiency rectifier such as rectifier 108. However, when the servers 102 need additional power for short or long term peak loads, the BBS 106 may provide some or all of the additional power needed rather than relying on grid sources for the extra power.

Figure 2A:
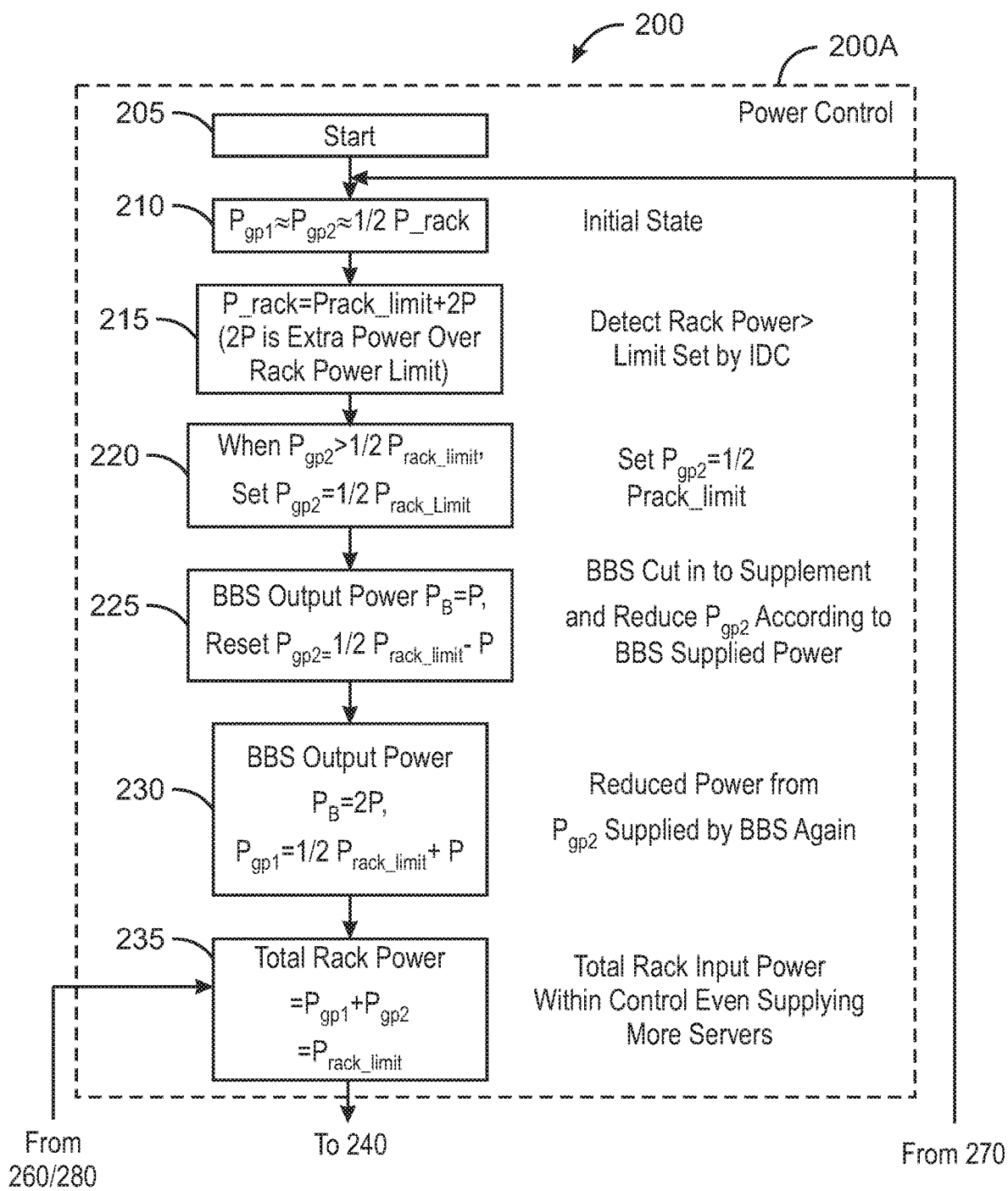
FIG. 2A and FIG. 2B illustrate a flow diagram of controlling rack input power in accordance with some embodiments.
Figure 2B:
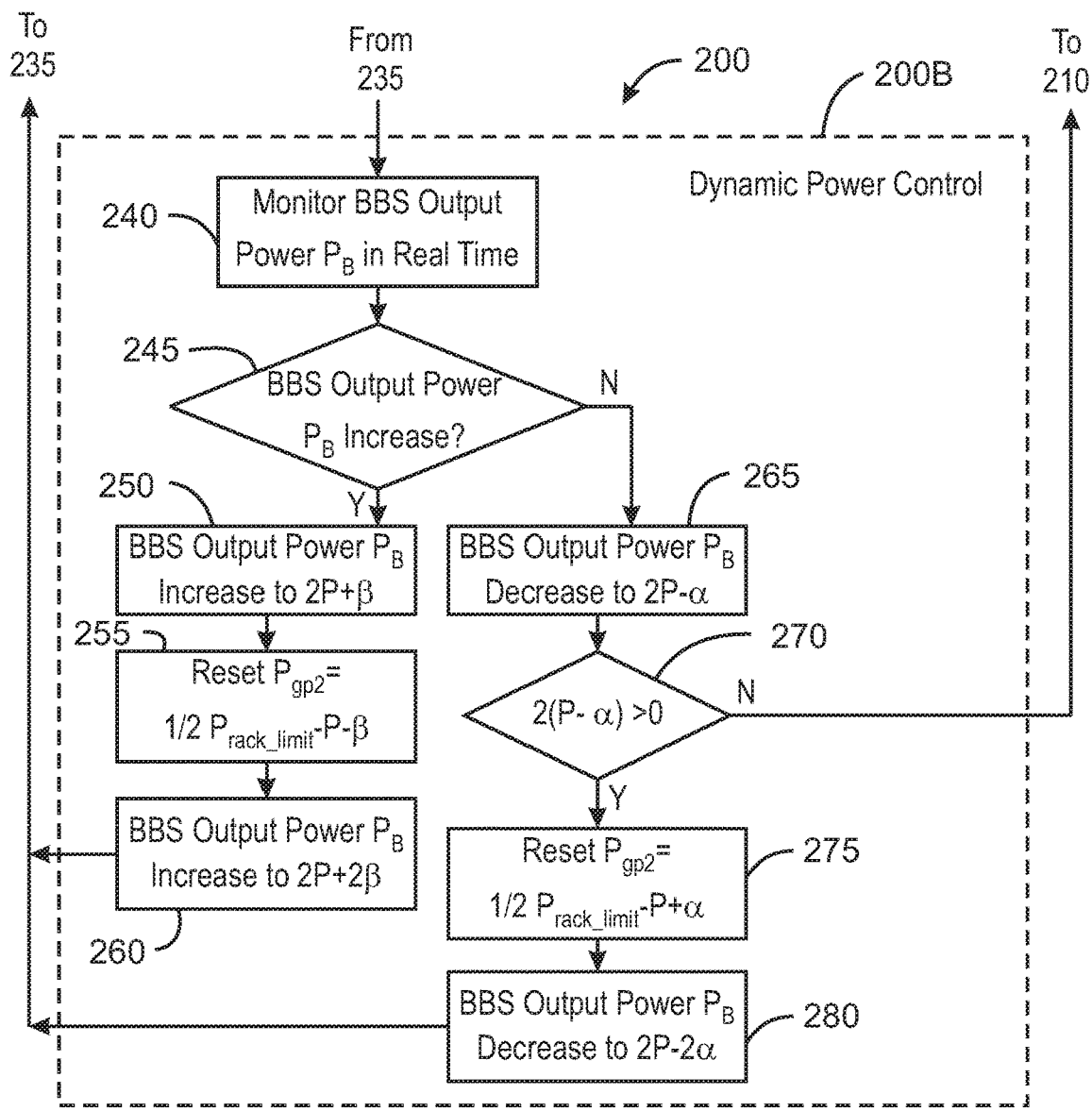

FIG. 2, which includes FIG. 2A and FIG. 2B, illustrates a flow diagram 200 that can relate to a method of controlling total rack input power, according to some embodiments. The operations of flow diagram 200 may be performed by a control unit comprised of one or more processors, monitoring logic, control logic, software, firmware, agents, controllers, and/or other modules. For example, in some embodiments, some or all of the operations of flow 200 may be implemented by a system agent such as a Rack Management Controller (RMC). Due to the variety of modules and their configurations that may be used to perform these functions, and their distribution through the system, they are not shown in FIG. 2. However, in various embodiments the control module may be within a rectifier (for example, within rectifier 108), external to a rectifier (for example, external to rectifier 108), or partly within and partly external to a rectifier (for example, partly within and partly external to rectifier 108). It is noted that flow 200 shows some embodiments, and many other embodiments include similar and/or different flow.

In some embodiments, flow 200 can include power control flow 200A of FIG. 2A and dynamic power control 200B of FIG. 2B. The flow 200 may start at 205, and at initial state 210 the grid sources $P_{gp1}$ and $P_{gp2}$ may each provide approximately ½ (one half) of the total rack power $P_{\_rack}$. Operation 215 can detect that rack power is greater than a limit. In some embodiments, at 215, the control unit may determine that the load on the rack has risen and now exceeds the rack power limit $P_{rack\_limit}$ (for example, detect that rack power is greater than a limit set by an Internet Data Center). In some embodiments, operation 215 identifies that the load on the rack has risen and now exceeds the rack power limit $P_{rack\_limit}$ by an amount defined here as 2P (i.e., twice the value of P). For example, in some embodiments, $P_{rack\_limit}$ might be 8.8 kW. At 220, $P_{gp2}$ may be reset to a value of ½ $P_{rack\_limit}$. In some embodiments, as a result of the determination at 215, when $P_{gp2}$ starts exceeding ½ $P_{rack\_limit}$, at 220 the power level from $P_{gp2}$ may be reset to ½ $P_{rack\_limit}$.

In some embodiments, the system may contain a monitoring module (either internal or external to a rectifier such as rectifier 108) to monitor the output $P_B$ of a BBS (for example, to monitor the output of the BBS 106) and set the rectifier to limit its output power $P_R$ to the required level. In some embodiments, the rectifier may adjust its output power by adjusting its output voltage (e.g., increasing output voltage to increase output power, or decreasing output voltage to decrease output power). A BBS (for example, BBS106) may then naturally adjust its own output power to supply the extra power required from downstream servers when $P_R$ is reduced because $P_{gp2}$ exceeds a preset limit.

At 225, the BBS may cut in to supplement and reduce $P_{gp2}$ according to BBS supplied power. In some embodiments, the output power $P_B$ of the BBS may be set to P (½ the amount that the power demand exceeds $P_{rack\_limit}$, for example) per operation 215. Accordingly, $P_{gp2}$ may be reset to ½ $P_{rack\_limit}$–P, so that the output power of the BBS may increase further by P so that $P_B$ reaches a value of 2P.

At operation 230, reduced power from $P_{gp2}$ is again supplied by the BBS. At 230, BBS output power $P_B$ may be increased again, to 2P this time, and $P_{gp1}$ may be increased to ½ $P_{rack\_limit}$+P. At 235, total rack input power is within control even with additional servers 102 being provided in, for example, the 16 U area illustrated in FIG. 1, in addition to the servers 102 being provided in, for example, the 30 U area illustrated in FIG. 1. At this point, $P_{gp2}=\frac{1}{2} P_{rack\_limit}$–P, $P_{gp1}=\frac{1}{2} P_{rack\_limit}$+P, and BBS output power $P_B$=2P. Adding these together, the total power being supplied to the rack by $P_{gp1}$ and $P_{gp2}$ is $P_{rack\_limit}$, as seen at 235, while the power being supplied to the servers=$P_{rack\_limit}$+2P. Thus the servers are getting the power needed to meet peak load demand, while the Grid Power 1 and Grid Power 2 do not exceed their design limitations, even though the rack has more servers than would be feasible using a rack without a BBS, and the servers are drawing peak loads.

Operations 205-235 can describe some embodiments in which the total rack power required may transition from below or at $P_{rack\_limit}$ to above $P_{rack\_limit}$. Operations 240-280 describe some embodiments in which the total rack power may fluctuate dynamically between various levels which may be above or below $P_{rack\_limit}$.

In some embodiments, power control 200A and/or power adjustment (or dynamic power control) 200B can be implemented in a BBS such as BBS 106, for example. In some embodiments, control 200A and/or adjustment 200B is made to limit the power output $P_B$ of BBS 106.

As flow diagram 200 moves from operation 235 to operation 240, output power $P_B$ from the BBS is assumed to be 2P. (Remember, P was defined as ½ the amount by which $P_{\_rack}$ exceeded $P_{rack\_limit}$). At 240, the control unit may monitor the BBS output power $P_B$ in real time. If $P_B$ increases, as determined at 245, then then the amount of the increase may be defined as a first quantity β (beta), leaving $P_B=2P+\beta$ at 250. To offset the similar increase from $P_{gp1}$, at 255 $P_{gp2}$ may be reset to ½ $P_{rack\_limit}-P-\beta$. Then to offset operation 255, at operation 260 $P_B$ may be increased to $2P+2\beta$. This may return the flow diagram to 235, where the total power being supplied by $P_{gp1}$ and $P_{gp2}$ is $P_{rack\_limit}$, while the servers are receiving $P_{rack\_limit}$ + the new $P_B$ (which is now $2P+2\beta$).

The previous paragraph describes what may happen if an increase in BBS output is detected at 245. But if such an increase is not detected, flow may proceed to 265, where $P_B$ may be decreased by a second quantity α (alpha), leaving $P_B=2P-\alpha$. At 270 it may be determined if $2(P-\alpha)>0$. If so, at operation 275 $P_{gp2}$ may be reset to $P_{rack\_limit}-P+\alpha$. Then BBU output power $P_B$ may be decreased to $2P-2\alpha$ at 280 and flow may return to 235. At this point, total rack power $P_{\_rack}$ may=$P_{gp}+P_{gp2}=P_{rack\_limit}$. On the other hand, if $2(P-\alpha)$ is not>0, the flow may return to 210, where grid power is balanced with grid sources $P_{gp1}$ and $P_{gp2}$ each providing approximately ½ of the total rack power $P_{\_rack}$.

In some embodiments, system 100 and/or flow 200 can be implemented in a smart battery backup system (smart BBS) in which rack density of an Internet Data Center (IDC) is increased with a low total rack power budget limit. A BBS can be used in a server rack system to extend usage from just backup power (for example, Uninterruptible Power Supply, Uninterruptible Power Source, and/or UPS) during AC power failure to supplement extra peak power of the rack even during daily normal operation. In some embodiments, rack total input power can be limited to a preset level under a servers dynamic power/workload change, for example, and more servers can be used. Rack density may be increased using a BBS. In some embodiments, a smart BBS turbo rack can be used to increase rack density and/or to use more high thermal design power (TDP) central processing units (CPUs).

In some embodiments, two or more power supply units (PSUs) are included in each server, and total server power is evenly balanced between the PSUs of the server. In this manner, each PSU in a server can provide a portion of the overall power required by that server. For example, in a system such as system 100, each of the two PSUs 104 in a particular server 102 can provide one half of the power required by that server. However, in daily operation of a system such as system 100, one or more PSUs 104 may fail. Therefore, in some embodiments, additional functionality may be used to deal with an imbalanced power load situation when one or more PSU (such as one or more of the PSUs 104 of FIG. 1) fails.

Figure 3A:
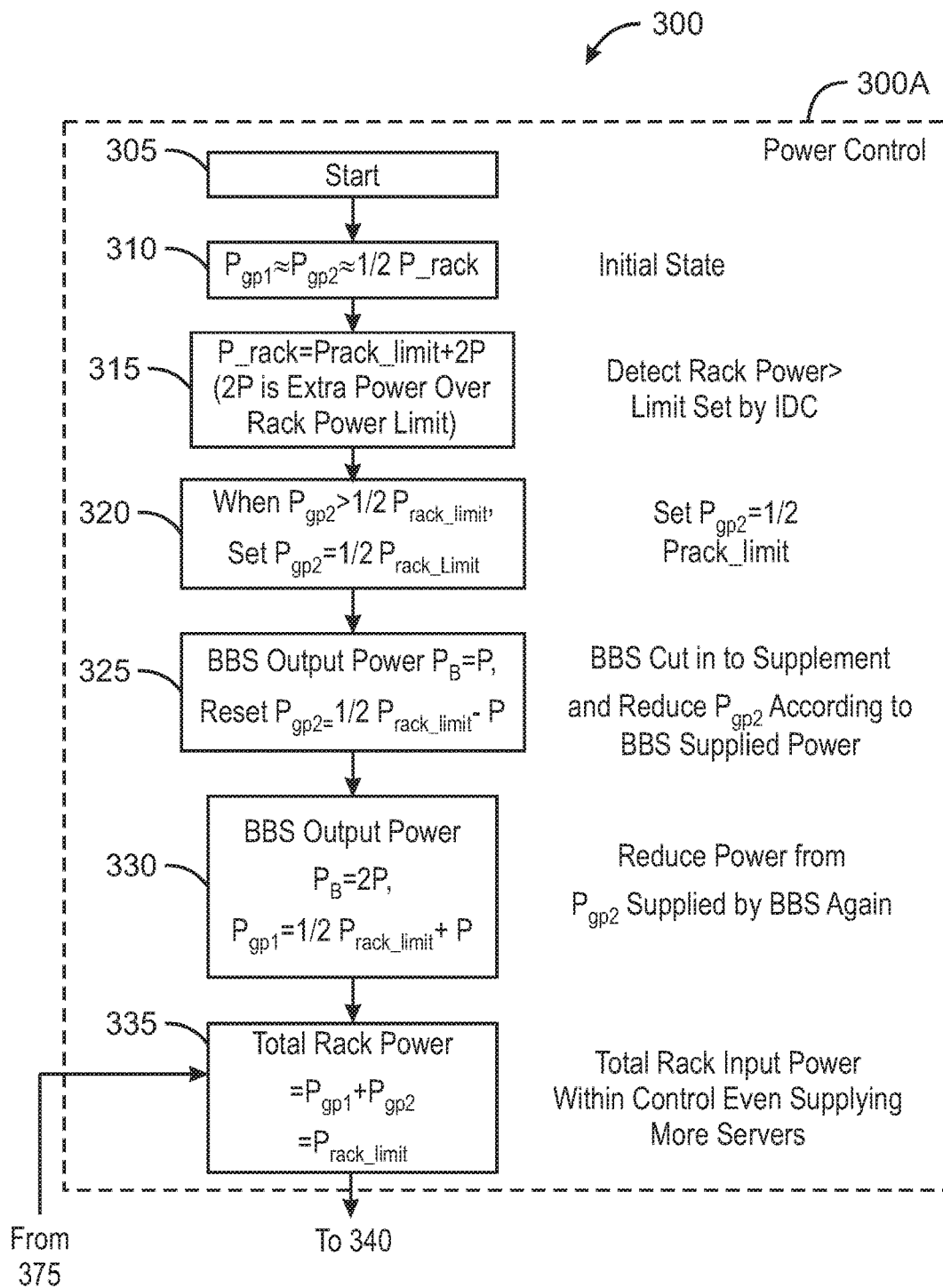
FIGS. 3A, 3B, and FIG. 3C illustrate a flow diagram of controlling rack input power in accordance with some embodiments.
Figure 3B:
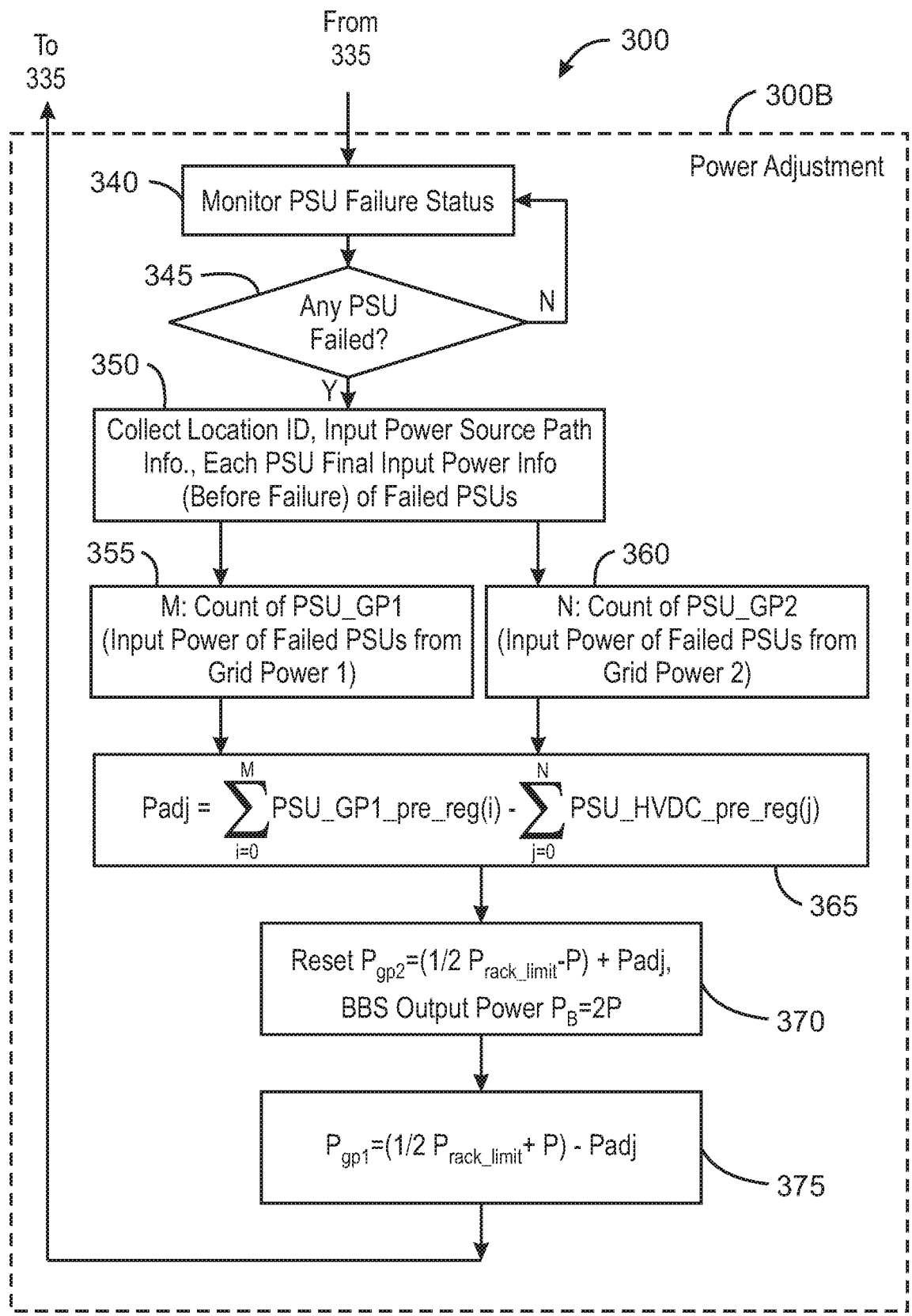
Figure 3C:
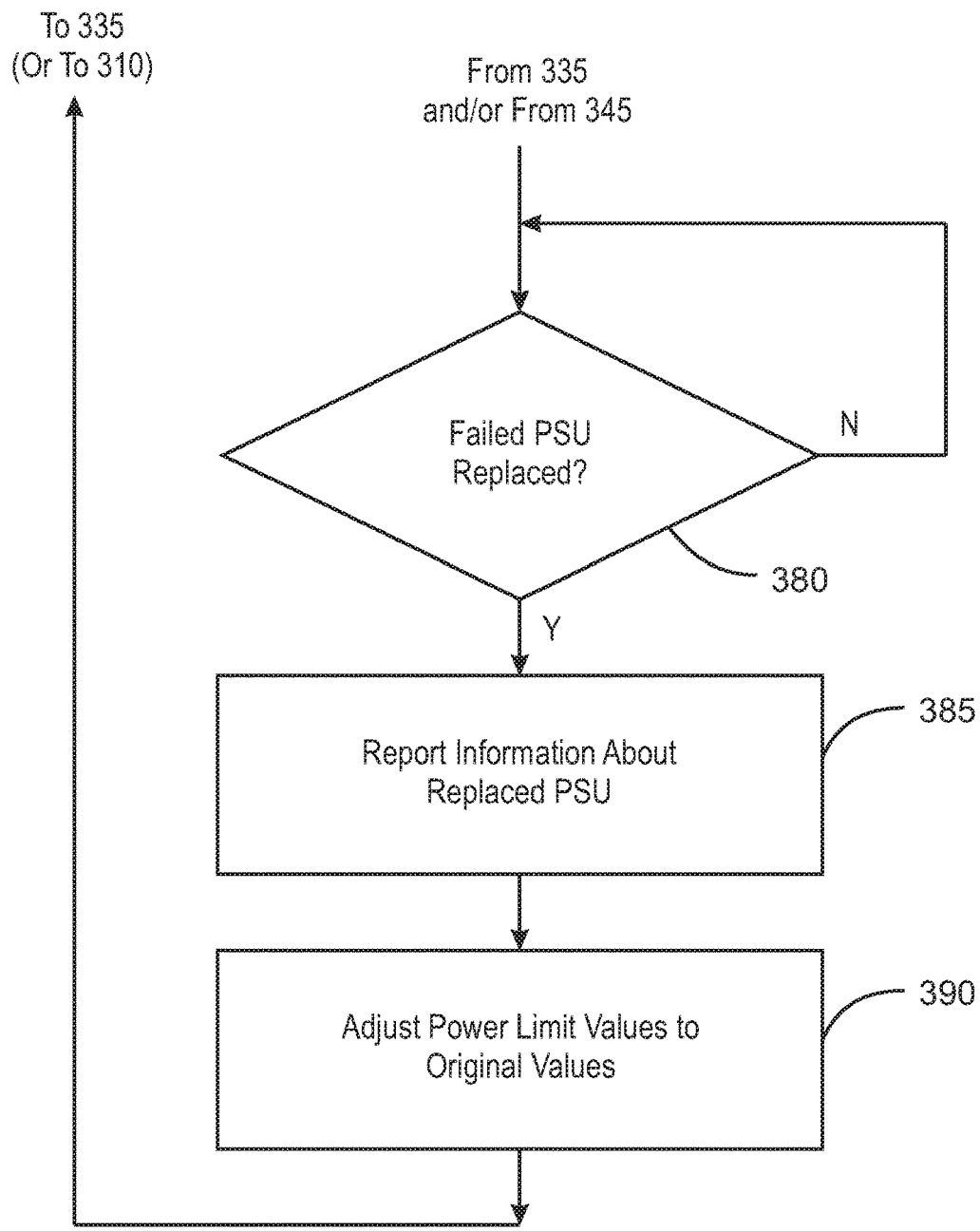

FIG. 3, which includes FIG. 3A, FIG. 3B, and FIG. 3C, illustrates a flow diagram 300 that can relate to a method of controlling rack input power, according to some embodiments. The operations of flow diagram 300 can include some or all of the operations illustrated in FIGS. 3A, 3B, and 3C. The operations of flow diagram 300 may be performed by a control unit comprised of one or more processors, monitoring logic, control logic, software, firmware, agents, controllers, and/or other modules. For example, in some embodiments, some or all of the operations of flow 300 may be implemented by a system agent such as a Rack Management Controller (RMC). Due to the variety of modules and their configurations that may be used to perform these functions, and their distribution through the system, they are not shown in FIG. 3. However, in various embodiments the control module may be within a rectifier (for example, within rectifier 108), external to a rectifier (for example, external to rectifier 108), or partly within and partly external to a rectifier (for example, partly within and partly external to rectifier 108). It is noted that flow 300 shows some embodiments, and many other embodiments include similar and/or different flow.

In some embodiments, flow 300 can include some or all of power control flow 300A of FIG. 3A, some or all of power adjustment 300B of FIG. 3B, and/or some or all of power adjustment 3000 of FIG. 3C. In some embodiments, power control 300A, power adjustment (or power control) 300B, and/or power adjustment (or power control) 3000 can be implemented in a BBS such as BBS 106, for example. In some embodiments, control 300A, adjustment 300B, and/or adjustment 3000 is made to limit the power output $P_B$ of BBS 106.

The flow 300 may start at 305, and at initial state 310 the grid sources $P_{gp1}$ and $P_{gp2}$ may each provide approximately ½ (one half) of the total rack power $P_{\_rack}$. Operation 315 can detect that rack power is greater than a limit. In some embodiments, at 315, the control unit may determine that the load on the rack has risen and now exceeds the rack power limit $P_{rack\_limit}$ (for example, detect that rack power is greater than a limit set by an Internet Data Center). In some embodiments, operation 315 identifies that the load on the rack has risen and now exceeds the rack power limit $P_{rack\_limit}$ by an amount defined here as 2P (i.e., twice the value of P). For example, in some embodiments, $P_{rack\_limit}$ might be 8.8 kW. At 320, $P_{gp2}$ may be reset to a value of $P_{rack\_limit}$. In some embodiments, as a result of the determination at 315, when $P_{gp2}$ starts exceeding ½ $P_{rack\_limit}$, at 320 the power level from $P_{gp2}$ may be reset to ½ $P_{rack\_limit}$.

In some embodiments, the system may contain a monitoring module (either internal or external to a rectifier such as rectifier 108) to monitor the output $P_B$ of a BBS (for example, to monitor the output of the BBS 106) and set the rectifier to limit its output power $P_R$ to the required level. In some embodiments, the rectifier may adjust its output power by adjusting its output voltage (e.g., increasing output voltage to increase output power, or decreasing output voltage to decrease output power). A BBS (for example, BBS 106) may then naturally adjust its own output power to supply the extra power required from downstream servers when $P_R$ is reduced because $P_{gp2}$ exceeds a preset limit.

At 325, the BBS may cut in to supplement and reduce $P_{gp2}$ according to BBS supplied power. In some embodiments, the output power $P_B$ of the BBS may be set to P (½ the amount that the power demand exceeds $P_{rack\_limit}$, for example) per operation 315. Accordingly, $P_{gp2}$ may be reset to ½ $P_{rack\_limit}-P$, so that the output power of the BBS may increase further by P so that $P_B$ reaches a value of 2P.

At operation 330, reduced power from $P_{gp2}$ is again supplied by the BBS. At 330, BBS output power $P_B$ may be increased again, to 2P this time, and $P_{gp1}$ may be increased to ½ $P_{rack\_limit}+P$. At 335, total rack input power is within control even with additional servers 102 being provided in, for example, the 16 U area illustrated in FIG. 1, in addition to the servers 102 being provided in, for example, the 30 U area illustrated in FIG. 1. At this point, $P_{gp2}=$½ $P_{rack\_limit}-P$, $P_{gp1}=$½ $P_{rack\_limit}+P$, and BBS output power $P_B=2P$. Adding these together, the total power being supplied to the rack by $P_{gp1}$ and $P_{gp2}$ is $P_{rack\_limit}$ as seen at 335, while the power being supplied to the servers=$P_{rack\_limit}+2P$. Thus the servers are getting the power needed to meet peak load demand, while the Grid Power 1 and Grid Power 2 do not exceed their design limitations, even though the rack has more servers than would be feasible using a rack without a BBS, and the servers are drawing more peak loads. As flow diagram 300 moves from operation 335, output power $P_B$ from the BBS is assumed to be 2P. (Remember, P was defined as ½ the amount by which P_rack exceeded P_rack_limit).

Operations 305-335 can describe some embodiments in which the total rack power required may transition from below or at P_rack_limit to above P_rack_limit. Operations 340-375 describe some embodiments in which one or more power supply unit (PSU) failure is monitored, and in the event of a power supply unit (PSU) failure, adjusting power to balance the overall server power. In some embodiments, power adjustment 300B, which can include operations 340-375, relates to power calibration to adjust power to balance server power.

In some embodiments, if a PSU in a server fails, the power path from that PSU to the server is cut off. For example, in some embodiments of FIG. 1, if a PSU 104 in a server 102 fails, the power path from that PSU 104 to the server 102 including that PSU 104 is cut off. In some embodiments, power adjustment 300B can include a determination of how many PSUs supplied by a first power source (for example, PSUs 104 on the left side of the servers 102 in FIG. 1 that are provided by Grid Power 1 $P_{gp1}$), and can also include a determination of how many PSUs supplied by a second power source (for example, PSUs 104 on the right side of the servers 102 in FIG. 1 that are provided by Grid Power 2 $P_{gp2}$, and/or by HVDC from rectifier 108 and/or BBS 106). In some embodiments, power adjustment 300B also determines total power information of the failed PSU(s) just before its failure. In some embodiments, one or more agents are included in the rack to monitor an output power of each PSU in the rack. In some embodiments, one or more agents can be included in one or more servers 102 in the rack of system 100, for example, to monitor the PSU output power. In some embodiments, a dedicated server can be included in the rack, for example, to monitor the PSU output power.

In some embodiments, adjustment 300B uses last reported information relating to input power of failed PSUs (for example, input power provided to failed PSU from Grid Power 1 or from Grid Power 2 just prior to failure of the PSU) to adjust provided power (for example, to adjust the actual power $P_{gp1}$ provided by Grid Power 1 and the actual power $P_{gp2}$ provided by Grid Power 2).

In some embodiments, adjustment 300B detects the PSU location (for example, in some embodiments, whether the PSU is one of the left side PSUs 104 or the right side PSUs 104 in FIG. 1). This information can be sent to an agent, for example. In addition, in some embodiments, the output power of the PSU just before failure is obtained. The previous supplied power from the respective power path of the failed PSU is cut off. For example, the power supplied from a power source can be reduced when a PSU fails (for example, if a left side PSU 104 of system 100 fails, the Grid Power source 1 power may be reduced by a corresponding amount). In such a case, power supplied to the server including the failed PSU can be increased to be supplied from another PSU within the server (for example, in the case of a left side PSU 104 failure in system 100, power may be provided by the right side PSU 104 of that server 102 for the entire server rather than just half of that server).

At 340, the control unit may monitor a power supply unit (PSU) failure status. For example, in some embodiments, a failed PSU whose input power is from Grid Power 1 may be referred to as a PSU_GP1 failure, and/or a failed PSU whose input power is from Grid Power 2 (and/or from HVDC) may be referred to as a PSU_GP2 failure, and/or as a PSU_HVDC failure. A determination is made at operation 345 as to whether a PSU (for example, a PSU such as one or more PSU 104 of FIG. 1) has failed. If one or more PSU has not failed at 345, the PSU failure status is continued to be monitored at 340. If one or more PSU has failed at 345, information about one or more of the failed PSU(s) is collected at 350.

For example, in some embodiments, a location identifier (location ID), input source power information, and/or failed input power information (for example, information just before failure of the PSU) of one or more (or each) of the failed PSU(s) can be collected. At 355, a count (M) of input power of failed PSU(s) from Grid Power 1 (for example, referred to as PSU_GP1) is determined. Similarly, at 360, a count (N) of input power of failed PSU(s) from Grid Power 2 (for example, referred to as PSU_GP2) is determined. At 365, a total power adjustment number Padj is summed according to, for example, the following Equation 1 as also shown at operation 365 in FIG. 3B:

$$Padj = \sum_{i=0}^{M} \text{PSU\_GP1\_pre\_reg}(i) - \sum_{j=0}^{N} \text{PSU\_HVDC\_pre\_reg}(j)$$

PSU_GP1 can refer to a PSU with input power from Grid Power 1 (for example, whose input power from Grid Power 1 has failed, and can be referred to as PSU_GP1 fails).

PSU_GP2 can refer to a PSU with input power from Grid Power 2 (for example, whose input power from Grid Power 2 has failed, and can be referred to as PSU_GP2 fails).

PSU_HVDC can refer to a PSU with input power HVDC and/or from Grid Power 2 (for example, whose input power from HVDC and/or Grid Power 2 has failed, and can be referred to as PSU_GP2 fails and/or PSU_HVDC fails).

PSU_GP1_pre_reg(i) can refer to a last report of data relating to an input power to one of the PSU_GP1 PSUs (for example, the $i^{th}$ failed PSU receiving power from Grid Power 1).

PSU_HVDC_pre_reg(j) can refer to a last report of data relating to an input power to one of the PSU_GP2 PSUs (for example, the $j^{th}$ failed PSU receiving power from Grid Power 2). It is noted that in some embodiments PSU_GP2_pre_reg(j) can be used to refer to a last report of data relating to an input power to one of the PSU_GP2 PSUs rather than using PSU_HVDC_pre_reg(j). For example, in some embodiments, PSU_GP2_pre_reg(j) may be used in Equation 1 in place of PSU_HVDC_pre_reg(j).

In some embodiments, the value Padj can be used to adjust power levels (for example, to adjust the previous power limit numbers). In some embodiments, the value Padj can be added to one of the power sources and subtracted from another of the power sources, for example. In some embodiments, Padj corresponds to a value that sums up all required adjusted power numbers to refresh the input power limit of Grid Power source 2 ($P_{gp2}$). For example, at 370, $P_{gp2}$ can be reset or re-adjusted to refresh the input power limit of Grid Power source 2. For example, in some embodiments, $P_{gp2}$ can be reset to a value equal to (½ $P_{rack\_limit}$−P)+$P_{adj}$. In some embodiments, the BBS output power $P_B$ can also be adjusted (for example, equal to a value of 2P). At 375, $P_{gp1}$ can be reset or re-adjusted to a value equal to (½ $P_{rack\_limit}$−P)−$P_{adj}$. In this manner, the total rack power $P_{gp1}$+$P_{gp2}$ can still be held within a same level even when one or more PSU failure has occurred. After adjusting $P_{gp2}$ at operation 370 and adjusting $P_{gp1}$ at operation 375, flow can return to operation 335 and/or operation 340 so that monitoring can be implemented for any additional PSU failures that may occur.

In some embodiments, when a system agent (for example, a Rack Management Controller or RMC) detects any failures of one or more PSU from PSU_GP1 and/or from PSU_GP2, for example, it can collect data such as, for example, location ID, input power path information, etc. of the failed PSU(s), and can also collect last reported input power data before failure for each of the failed PSU(s). In some embodiments, the system agent can use this information to calculate a total adjusted power number (for example, Padj) based on, for example, the location of the failed PSU(s) and their last input power data before failure. If the input power of a failed PSU is from Grid Power 1, for example, then $P_{gp1}$ (the rack input power from Grid Power 1) may decrease since the PSU is cut off from the power path of Grid Power 1. Similarly, if the input power of a failed PSU is from Grid Power 2 (for example, from the HVDC bus or root source from Grid Power 2), then the output power $P_B$ from the BBS may decrease, since the PSU is cut off from the path of the HVDC bus. It is noted that $P_{gp2}$ (the rack input power from Grid Power 2) may stay the same as a previous programmed value, and output power $P_B$ may decrease in such a situation. In some embodiments, Padj is used to sum up all required adjusted power numbers to refresh the input power limit of Grid Power source 2 ($P_{gp2}$). In some embodiments, the system agent uses Padj to reset (or re-adjust) the input power limit of Grid Power 2 (Pgp2), and the total rack input power $P_{gp1}+P_{gp2}$ is maintained at a same level when a PSU failure occurs as when a PSU failure has not occurred, for example.

In some embodiments, when a PSU fails, a failure indication and/or failure information can be reported. For example, the failure information may include a location ID of each failed PSU and its input power path/source. In some embodiments, the failure indication and/or failure information can be reported to a host and/or agent, which may be located within the same rack as the failed PSU. In some embodiments, a control agent can use the obtained information to adjust an input power limit value of a power source of a smart BBS to maintain total input power of the rack (for example, a turbo rack) to stay within a preset limit. This power limit value can be re-adjusted in accordance with various embodiments.

In some embodiments, if failed PSUs are replaced with good working PSUs, a fix indication can be reported (for example, can be reported to a host and/or agent. For example, the fix indicator can report a location ID of each failed PSU that has been replaced along with its input power path/source. The control agent can then resume a power limit of the power source of the BBS (for example, smart BBS) to its original value, and maintain the total input power to the rack (for example, to the turbo rack) to be maintained within the pre-set limit.

FIG. 3C illustrates power adjustment 3000 according to some embodiments. Flow moves to operation 380 from operation 335 and/or from operation 345, for example. At 380, a determination is made as to whether a failed PSU has been replaced. If a failed PSU, has not been replaced, flow remains at 380 to wait until a failed PSU has been replaced. If a failed PSU has been replaced at 380, operation 385 reports information about the replaced PSU at 385, and adjusts power limit values to original values at 390 (for example, adjust power limit values such as $P_{gp1}$, $P_{gp2}$, and/or $P_B$, etc. to original values). After operations 385 and 390, flow then returns to operation 335 in some embodiments.

Alternatively, after operations 385 and/or 390, flow can be returned to operation 310 in some embodiments. It is noted that power adjustment 300C can be implemented at other points within flow 300 according to some embodiments, and can interact with the flow illustrated in FIGS. 3A and/or 3B in different ways and/or at different operational points in the flow according to some embodiments.

Figure 4:
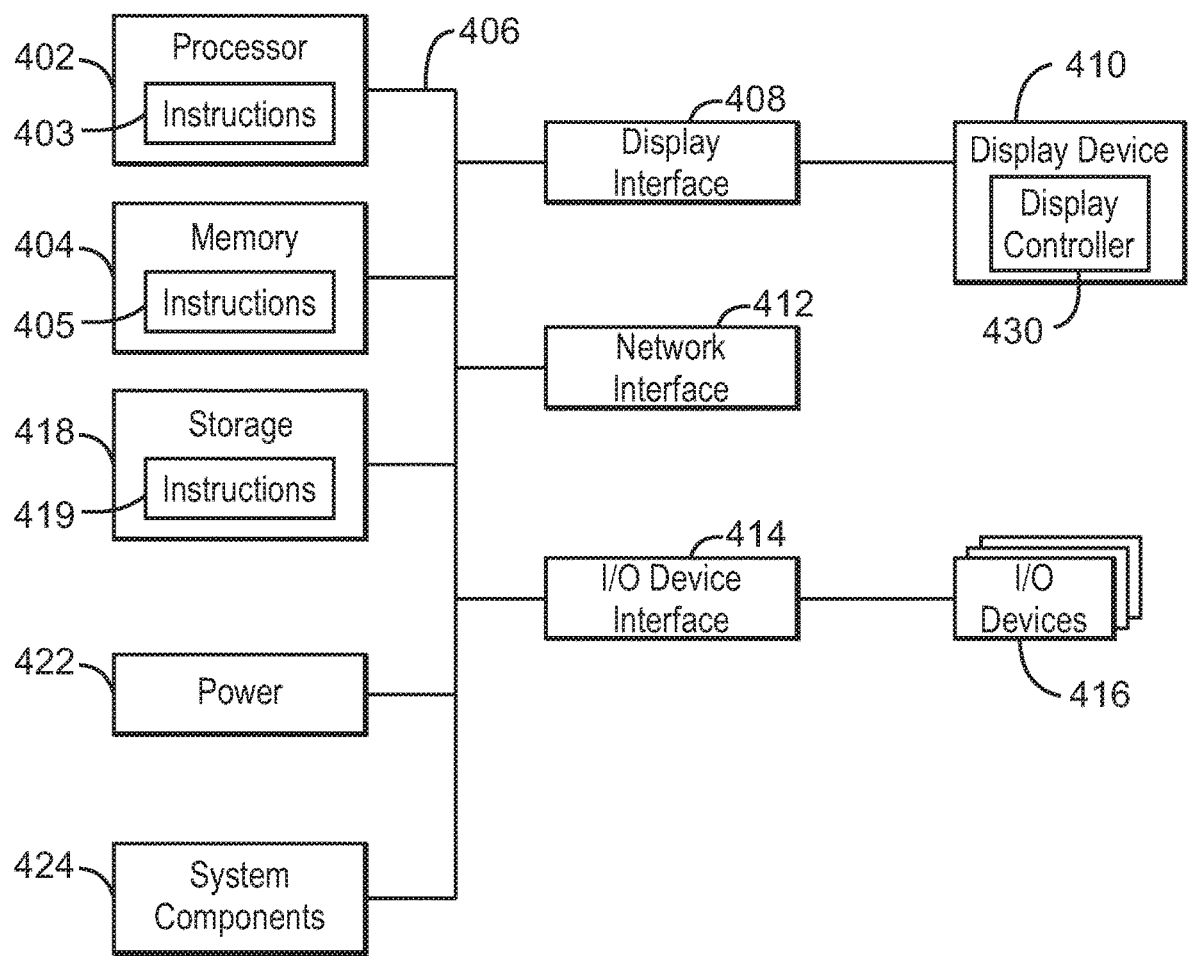
FIG. 4 illustrates a computing system in accordance with some embodiments.

FIG. 4 is a block diagram of an example of a computing device 400 in accordance with some embodiments. In some embodiments, computing device 400 may be a computing device included in a rack. In some embodiments, computing device 400 may be a server. For example, in some embodiments, computing device 400 may be one or more of servers 102 illustrated in FIG. 1. In some embodiments, computing device 400 may be an additional computing device in system 100 that is not illustrated in FIG. 1. In some embodiments, computing device 400 may be a computing device that is not in system 100 illustrated in FIG. 1, but provides functions illustrated and/or described herein that relate to and/or control system 100.

In some embodiments, functions of computing device 400 can include, for example, power control, dynamic power control, power adjustment, PSU failure monitoring, PSU replacement monitoring, and/or any other techniques described and/or illustrated herein, etc., according to some embodiments. In some embodiments, any portion of the flow, circuits or systems illustrated in any one or more of the figures, and any of the embodiments described herein can be included in or be implemented by computing device 400. The computing device 400 may be, for example, a computing device, a server, a controller, or an application specific controller, among others.

The computing device 400 may include a processor 402 that is adapted to execute stored instructions (for example, instructions 403), as well as a memory device 404 (or storage 404) that stores instructions 405 that are executable by the processor 402. The processor 402 can be a single core processor, a multi-core processor, a computing cluster, or any number of other configurations. For example, processor 402 can be an Intel® processor such as an Intel® Celeron, Pentium, Core, Core i3, Core i5, or Core i7 processor. In some embodiments, processor 402 can be an Intel® x86 based processor. In some embodiments, processor 402 can be an ARM based processor. The memory device 404 can be a memory device or a storage device, and can include volatile storage, non-volatile storage, random access memory, read only memory, flash memory, or any other suitable memory or storage systems. The instructions that are executed by the processor 402 may also be used to implement hybrid power boost charging and/or conversion, peak power management, peak power protection, etc. as described in this specification. In some embodiments, processor 402 may include the same or similar features or functionality as, for example, various controllers or agents in this disclosure.

The processor 402 may also be linked through the system interconnect 406 (e.g., PCI®, PCI-Express®, NuBus, etc.) to a display interface 408 adapted to connect the computing device 400 to a display device 410. The display device 410 may include a display controller 430. Display device 410 may also include a display screen that is a built-in component of the computing device 400. The display device may also include a computer monitor, television, or projector, among others, that is externally connected to the computing device 400. In some embodiments, computing device 400 does not include a display interface or a display device.

In some embodiments, the display interface 408 can include any suitable graphics processing unit, transmitter, port, physical interconnect, and the like. In some examples, the display interface 408 can implement any suitable protocol for transmitting data to the display device 410. For example, the display interface 408 can transmit data using a high-definition multimedia interface (HDMI) protocol, a DisplayPort protocol, or some other protocol or communication link, and the like In addition, a network interface controller (also referred to herein as a NIC) 412 may be adapted to connect the computing device 400 through the system interconnect 406 to a network (not depicted). The network (not depicted) may be a cellular network, a radio network, a wide area network (WAN), a local area network (LAN), or the Internet, among others.

The processor 402 may be connected through system interconnect 406 to an input/output (I/O) device interface 414 adapted to connect the computing host device 400 to one or more I/O devices 416. The I/O devices 416 may include, for example, a keyboard or a pointing device, where the pointing device may include a touchpad or a touchscreen, among others. The I/O devices 416 may be built-in components of the computing device 400, or may be devices that are externally connected to the computing device 400.

In some embodiments, the processor 402 may also be linked through the system interconnect 406 to a storage device 418 that can include a hard drive, a solid-state drive (SSD), a magnetic drive, an optical drive, a USB flash drive, an array of drives, or any other type of storage, including combinations thereof. In some embodiments, the storage device 418 can include any suitable applications that can be used by processor 402 to implement any of the techniques described herein. In some embodiments, storage 418 stores instructions 419 that are executable by the processor 402. In some embodiments, the storage device 418 can include a basic input/output system (BIOS).

In some embodiments, a power device 422 is provided. For example, in some embodiments, power device 422 can provide charging, power, power supply, power delivery, power management, peak power management, under-voltage protection, power control, voltage regulation, power generation, voltage generation, power protection, or voltage protection, etc. Power 422 can also include any of the power control and adjustment described herein. In some embodiments, power 422 can include one or more power supply units (PSUs). In some embodiments, power 422 can include one or more PSUs such as PSUs 104. In some embodiments, power 422 can be a part of system 400, and in some embodiments, power 422 can be external to the rest of system 400. In some embodiments, power 422 can provide any of charging, power, power supply, power delivery, power management, peak power management, under-voltage protection, power control, voltage regulation, power generation, voltage generation, power protection, or voltage protection, power control, power adjustment, or any other techniques such as those described herein. For example, in some embodiments, power 422 can provide power control, dynamic power control, power adjustment, PSU failure monitoring, PSU replacement monitoring, etc. as described in reference to or illustrated in any of the drawings herein.

FIG. 4 also illustrates system components 424. In some embodiments, system components 424 can include any of display, camera, audio, storage, modem, or memory components, or any additional system components. In some embodiments, system components 424 can include any system components for which power, voltage, power management, etc. can be implemented according to some embodiments as described herein.

It is to be understood that the block diagram of FIG. 4 is not intended to indicate that the computing device 400 is to include all of the components shown in FIG. 4 in all embodiments. Rather, the computing device 400 can include fewer or additional components not illustrated in FIG. 4 (e.g., additional memory components, embedded controllers, additional modules, additional network interfaces, etc.). Furthermore, any of the functionalities of power device 422 may be partially, or entirely, implemented in hardware or in a processor such as processor 402. For example, the functionality may be implemented with an application specific integrated circuit, logic implemented in an embedded controller, or in logic implemented in the processor 402, among others. In some embodiments, the functionalities of power device 422 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 422 can be implemented with an integrated circuit.

Figure 5:
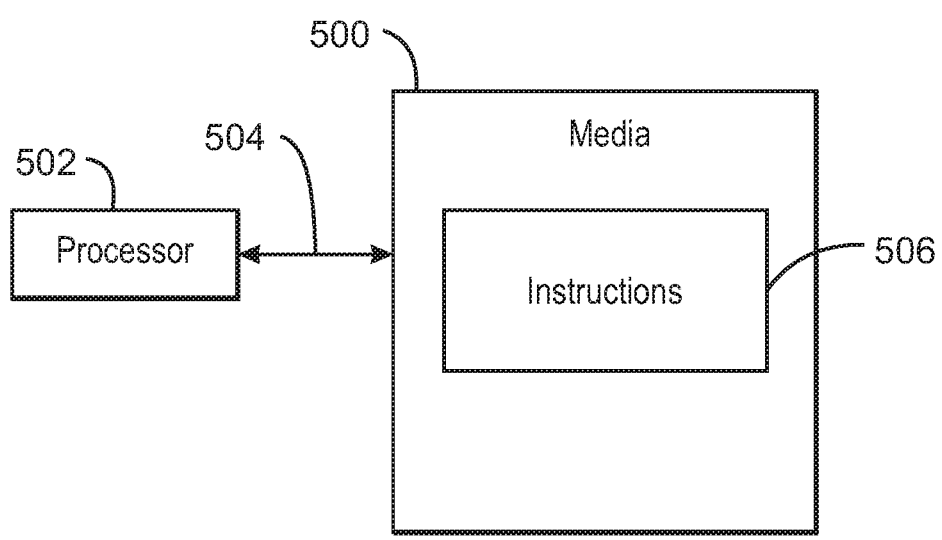
FIG. 5 illustrates one or more processors and one or more media in accordance with some embodiments.

FIG. 5 is a block diagram of an example of one or more processors 502 and one or more tangible, non-transitory computer readable media 500 for power control, dynamic power control, power adjustment, PSU failure monitoring, PSU replacement monitoring, etc. The one or more tangible, non-transitory, computer-readable media 500 may be accessed by the processor(s) 502 over a computer interconnect 504. Furthermore, the one or more tangible, non-transitory, computer-readable media 500 may include instructions (or code) 506 to direct the processor(s) 502 to perform operations as described herein. In some embodiments, processor 502 is one or more processors. In some embodiments, processor(s) 502 can perform some or all of the same or similar functions that can be performed by other elements described herein using instructions (code) 506 included on media 500 (for example, some or all of the functions illustrated in or described in reference to any of FIGS. 1-3). In some embodiments, one or more of processor(s) 502 may include the same or similar features or functionality as, for example, various controllers, units, or agents, etc. described in this disclosure. In some embodiments, one or more processor(s) 502, interconnect 504, and/or media 500 may be included in computing device 400.

Various components discussed in this specification may be implemented using software components. These software components may be stored on the one or more tangible, non-transitory, computer-readable media 500, as indicated in FIG. 5. For example, power control, dynamic power control, power adjustment, PSU failure monitoring, PSU failure replacement monitoring, etc. may be adapted to direct the processor(s) 502 to perform one or more of any of the operations described in this specification and/or in reference to the drawings.

It is to be understood that any suitable number of software components may be included within the one or more tangible, non-transitory computer-readable media 500. Furthermore, any number of additional software components shown or not shown in FIG. 5 may be included within the one or more tangible, non-transitory, computer-readable media 500, depending on the specific application.

The various techniques and/or operations described herein (for example, in reference to any one or more of FIGS. 1-5) may be performed by a control unit comprised of one or more processors, monitoring logic, control logic, software, firmware, agents, controllers, logical software agents, system agents, and/or other modules. For example, in some embodiments, some or all of the techniques and/or operations described herein may be implemented by a system agent such as a Rack Management Controller (RMC). Due to the variety of modules and their configurations that may be used to perform these functions, and their distribution through the system and/or in a different system, they are not all specifically illustrated in their possible locations in the figures. However, in some embodiments the control unit may be within a rectifier (for example, within rectifier 108), external to a rectifier (for example, external to rectifier 108), or partly within and partly external to a rectifier (for example, partly within and partly external to rectifier 108). In various embodiments the control module may be within a BBS (for example, within BBS 106), external to a BBS (for example, external to BBS 106), or partly within and partly external to a BBS (for example, partly within and partly external to BBS 106). In some embodiments, various techniques and/or operations described herein may be implemented in one or more computing devices in a rack (for example, one or more servers in a rack), one or more computing devices used as a computing device in a rack (for example, one or more servers used as a server in a rack) and not dedicated to the techniques and/or operations described herein, one or more computing device (for example, one or more servers) dedicated to the techniques and/or operations described herein, one or more computing devices such as one or more servers in another rack (for example, by a server or other computing device managing multiple racks), a computing device (for example, a server) in the same network (but not necessarily in the same rack), a computing device (for example, a server) connected to the rack via the cloud, the internet, etc., and/or various other implementations.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, a control unit (and/or an apparatus) is configured to control a computer server rack having a first grid power source, a second grid power source, and a battery backup system. The control unit is adapted to monitor a failed status of one or more power supply units in the computer server rack, to determine location information relating to the one or more power supply units having the failed status, to determine input power of the one or more power supply units having the failed status, to adjust an input power of the first grid power source based on the determined input power, and to adjust an input power of the second grid power source based on the determined input power.

Example 2 includes the subject matter of example 1. In example 2, the control unit is at least partially included in one of a plurality of servers in the computer server rack, a dedicated server in the computer server rack, a computing device in a rectifier, a backup battery system, and/or a computing device that is not included in the computer server rack.

Example 3 includes the subject matter of any of examples 1-2. In example 3, the control unit is adapted to determine input power of the one or more power supply units having the failed status, wherein the determined input power of the one or more power supply units is an input power occurring prior to the failed status of the one or more power supply units.

Example 4 includes the subject matter of any of examples 1-3. In example 4, the control unit is adapted to determine if one or more of the power supply units having the failed status have been replaced, and, if the one or more of the power supply units having the failed status have been replaced, the control unit is adapted to adjust one or more power limit values to original values.

Example 5 includes the subject matter of any of examples 1-4. In example 5, the control unit is adapted to determine if one or more of the power supply units having the failed status have been replaced, and, if the one or more power supply units having the failed status have been replaced, the control unit is adapted to adjust an input power limit value of the first grid power source.

Example 6 includes the subject matter of any of examples 1-5. In example 6, the control unit adapted to, if the one or more power supply units having the failed status have been replaced, adjust an input power limit value of the second grid power source.

Example 7 includes the subject matter of any of examples 1-6. In example 7, the control unit adapted to adjust the input power of the first grid power source based on data of input power relating to each of a plurality of power supply units in the computer server rack having a failed status, and to adjust the input power of the second grid power source based on the data of input power relating to each of the plurality of power supply units in the computer server rack having a failed status.

Example 8 includes the subject matter of any of examples 1-7. In example 8, the control unit is adapted to adjust an output power of the battery backup system.

Example 9 In some examples, one or more tangible, non-transitory machine readable media include a plurality of instructions that, in response to being executed on at least one processor, cause the at least one processor to monitor a failed status of one or more power supply units in the computer server rack, to determine location information relating to the one or more power supply units having the failed status, to determine input power of the one or more power supply units having the failed status, to adjust an input power of the first grid power source based on the determined input power, and to adjust an input power of the second grid power source based on the determined input power.

Example 10 includes the subject matter of example 9. In example 10, the media includes a plurality of instructions that, in response to being executed on at least one processor, cause the at least one processor to determine input power of the one or more power supply units having the failed status, where the determined input power of the one or more power supply units is an input power occurring prior to the failed status of the one or more power supply units.

Example 11 includes the subject matter of any of examples 9-10. In example 11, the media includes a plurality of instructions that, in response to being executed on at least one processor, cause the at least one processor to determine if one or more of the power supply units having the failed status have been replaced, and, if the one or more of the power supply units having the failed status have been replaced, to adjust one or more power limit values to original values.

Example 12 includes the subject matter of any of examples 9-11. In example 12, the media includes a plurality of instructions that, in response to being executed on at least one processor, cause the at least one processor to determine if one or more of the power supply units having the failed status have been replaced, and, if the one or more power supply units having the failed status have been replaced, to adjust an input power limit value of the first grid power source.

Example 13 includes the subject matter of any of examples 9-12. In example 13, the media includes a plurality of instructions that, in response to being executed on at least one processor, cause the at least one processor to, if the one or more power supply units having the failed status have been replaced, adjust an input power limit value of the second grid power source.

Example 14 includes the subject matter of any of examples 9-13. In example 14, the media includes a plurality of instructions that, in response to being executed on at least one processor, cause the at least one processor to adjust the input power of the first grid power source based on data of input power relating to each of a plurality of power supply units in the computer server rack having a failed status, and to adjust the input power of the second grid power source based on the data of input power relating to each of the plurality of power supply units in the computer server rack having a failed status.

Example 15 includes the subject matter of any of examples 9-14. In example 15, the media includes a plurality of instructions that, in response to being executed on at least one processor, cause the at least one processor to adjust an output power of the battery backup system.

Example 16 In some examples, a method of controlling power in a computer server rack having a first grid power source, a second grid power source, and a battery backup system. The method includes monitoring a failed status of one or more power supply units in the computer server rack, determining location information relating to the one or more power supply units having the failed status, determining input power of the one or more power supply units having the failed status, adjusting an input power of the first grid power source based on the determined input power, and adjusting an input power of the second grid power source based on the determined input power. The method may be implemented at least partially in one of a plurality of servers in the computer server rack, a dedicated server in the computer server rack, a computing device in a rectifier, a backup battery system, and/or a computing device that is not included in the computer server rack (for example, it may be implemented at another server, another rack, in the cloud, via the Internet, etc).

Example 17 includes the subject matter of example 16. In example 17, the method includes determining input power of the one or more power supply units having the failed status, where the determined input power of the one or more power supply units is an input power occurring prior to the failed status of the one or more power supply units.

Example 18 includes the subject matter of any of examples 16-17. In example 18, the method includes determining if one or more of the power supply units having the failed status have been replaced, and, if the one or more of the power supply units having the failed status have been replaced, adjusting one or more power limit values to original values.

Example 19 includes the subject matter of any of examples 16-18. In example 19, the method includes determining if one or more of the power supply units having the failed status have been replaced, and, if the one or more power supply units having the failed status have been replaced, adjusting an input power limit value of the first grid power source.

Example 20 includes the subject matter of any of examples 16-19. In example 20, the method includes, if the one or more power supply units having the failed status have been replaced, adjusting an input power limit value of the second grid power source.

Example 21 includes the subject matter of any of examples 16-20. In example 21, the method includes adjusting the input power of the first grid power source based on data of input power relating to each of a plurality of power supply units in the computer server rack having a failed status, and adjusting the input power of the second grid power source based on the data of input power relating to each of the plurality of power supply units in the computer server rack having a failed.

Example 22 includes the subject matter of any of examples 16-21. In example 22, the method includes adjusting an output power of the battery backup system.

Example 23 In some examples, an apparatus (and/or a control unit) configured to control a computer server rack having a first grid power source, a second grid power source, and a battery backup system. The apparatus includes means for monitoring a failed status of one or more power supply units in the computer server rack, means for determining location information relating to the one or more power supply units having the failed status, means for determining input power of the one or more power supply units having the failed status, means for adjusting an input power of the first grid power source based on the determined input power, and means for adjusting an input power of the second grid power source based on the determined input power.

Example 24 includes the subject matter of example 23. In example 24, the apparatus is at least partially included in one of a plurality of servers in the computer server rack, a dedicated server in the computer server rack, a computing device in a rectifier, a backup battery system, and/or a computing device that is not included in the computer server rack.

Example 25 includes the subject matter of any of examples 23-24. In example 25, the apparatus includes means for determining input power of the one or more power supply units having the failed status, wherein the determined input power of the one or more power supply units is an input power occurring prior to the failed status of the one or more power supply units.

Example 26 includes the subject matter of any of examples 23-25. In example 26, the apparatus includes means for determining if one or more of the power supply units having the failed status have been replaced, and means for adjusting one or more power limit values to original values if the one or more of the power supply units having the failed status have been replaced.

Example 27 includes the subject matter of any of examples 23-26. In example 27, the apparatus includes means for determining if one or more of the power supply units having the failed status have been replaced, and means for adjusting an input power limit value of the first grid power source if the one or more power supply units having the failed status have been replaced.

Example 28 includes the subject matter of any of examples 23-27. In example 28, the apparatus includes means for adjusting an input power limit value of the second grid power source if the one or more power supply units having the failed status have been replaced.

Example 29 includes the subject matter of any of examples 23-28. In example 29, the apparatus includes means for adjusting the input power of the first grid power source based on data of input power relating to each of a plurality of power supply units in the computer server rack having a failed status, and means for adjusting the input power of the second grid power source based on the data of input power relating to each of the plurality of power supply units in the computer server rack having a failed status.

Example 30 includes the subject matter of any of examples 23-29. In example 30, the apparatus includes means for adjusting an output power of the battery backup system.

Example 31 In some examples, a system including a computer server rack having a first grid power source, a second grid power source, and a battery backup system. The system also includes a control unit configured to control the computer server rack and the battery backup system. The control unit is adapted to monitor a failed status of one or more power supply units in the computer server rack, to determine location information relating to the one or more power supply units having the failed status, to determine input power of the one or more power supply units having the failed status, to adjust an input power of the first grid power source based on the determined input power, and to adjust an input power of the second grid power source based on the determined input power.

Example 32 includes the subject matter of example 31. In example 32, the control unit is at least partially included in one of a plurality of servers in the computer server rack, a dedicated server in the computer server rack, a computing device in a rectifier, a backup battery system, and/or a computing device that is not included in the computer server rack.

Example 33 includes the subject matter of any of examples 31-32. In example 33, the control unit is adapted to determine input power of the one or more power supply units having the failed status, where the determined input power of the one or more power supply units is an input power occurring prior to the failed status of the one or more power supply units.

Example 34 includes the subject matter of any of examples 31-33. In example 34, the control unit is adapted to determine if one or more of the power supply units having the failed status have been replaced, and, if the one or more of the power supply units having the failed status have been replaced, to adjust one or more power limit values to original values.

Example 35 includes the subject matter of any of examples 31-34. In example 35, the control unit is adapted to determine if one or more of the power supply units having the failed status have been replaced, and, if the one or more power supply units having the failed status have been replaced, to adjust an input power limit value of the first grid power source.

Example 36 includes the subject matter of any of examples 31-35. In example 36, the control unit is adapted to, if the one or more power supply units having the failed status have been replaced, adjust an input power limit value of the second grid power source.

Example 37 includes the subject matter of any of examples 31-36. In example 37, the control unit is adapted to adjust the input power of the first grid power source based on data of input power relating to each of a plurality of power supply units in the computer server rack having a failed status, and to adjust the input power of the second grid power source based on the data of input power relating to each of the plurality of power supply units in the computer server rack having a failed status.

Example 38 includes the subject matter of any of examples 31-37. In example 38, the control unit is adapted to adjust an output power of the battery backup system.

Example 39 In some examples, a system including a computer server rack having a first grid power source, a second grid power source, and a battery backup system. The system also includes means for controlling the computer server rack and the battery backup system. The means for controlling includes means for monitoring a failed status of one or more power supply units in the computer server rack, means for determining location information relating to the one or more power supply units having the failed status, means for determining input power of the one or more power supply units having the failed status, means for adjusting an input power of the first grid power source based on the determined input power, and means for adjusting an input power of the second grid power source based on the determined input power.

Example 40 includes the subject matter of example 39. In example 40, the means for controlling is at least partially included in one of a plurality of servers in the computer server rack, a dedicated server in the computer server rack, a computing device in a rectifier, a backup battery system, and/or a computing device that is not included in the computer server rack.

Example 41 includes the subject matter of any of examples 39-40. In example 41, the means for controlling includes means for determining input power of the one or more power supply units having the failed status, where the determined input power of the one or more power supply units is an input power occurring prior to the failed status of the one or more power supply units.

Example 42 includes the subject matter of any of examples 39-41. In example 42, the means for controlling includes means for determining if one or more of the power supply units having the failed status have been replaced, and means for adjusting one or more power limit values to original values if the one or more of the power supply units having the failed status have been replaced.

Example 43 includes the subject matter of any of examples 39-42. In example 43, the means for controlling includes means for determining if one or more of the power supply units having the failed status have been replaced, and means for adjusting an input power limit value of the first grid power source if the one or more power supply units having the failed status have been replaced.

Example 44 includes the subject matter of any of examples 39-43. In example 44, the means for controlling includes means for adjusting an input power limit value of the second grid power source if the one or more power supply units having the failed status have been replaced.

Example 45 includes the subject matter of any of examples 39-44. In example 45, the means for controlling includes means for adjusting the input power of the first grid power source based on data of input power relating to each of a plurality of power supply units in the computer server rack having a failed status, and means for adjusting the input power of the second grid power source based on the data of input power relating to each of the plurality of power supply units in the computer server rack having a failed status.

Example 46 includes the subject matter of any of examples 39-45. In example 46, the means for controlling includes means for adjusting an output power of the battery backup system.

Example 47 In some examples, an apparatus including means to perform a method as in any other example.

Example 48 In some examples, an apparatus including a computer server rack having a first grid power source, a second grid power source, and a battery backup system. The apparatus includes means to perform a method as in any other example.

Example 49 In some examples, machine-readable storage including machine-readable instructions, when executed, to implement a method or realize an apparatus as in any other example.

Example 50 In some examples, one or more machine readable medium including code, when executed, to cause a machine to perform the method of any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A control unit configured to control a computer server rack having a first grid power source, a second grid power source, and a battery backup system, the control unit adapted to:
   monitor a failed status of one or more power supply units in the computer server rack;
   determine location information relating to the one or more power supply units having the failed status;
   determine input power of the one or more power supply units having the failed status;
   adjust an input power of the first grid power source based on the determined input power; and adjust an input power of the second grid power source based on the determined input power.

2. The control unit of claim 1, wherein the control unit is at least partially included in one of a plurality of servers in the computer server rack, a dedicated server in the computer server rack, a computing device in a rectifier, a backup battery system, and/or a computing device that is not included in the computer server rack.

3. The control unit of claim 1, the control unit adapted to determine input power of the one or more power supply units having the failed status, wherein the determined input power of the one or more power supply units is an input power occurring prior to the failed status of the one or more power supply units.

4. The control unit of claim 1, the control unit adapted to:
determine if one or more of the power supply units having the failed status have been replaced; and
if the one or more of the power supply units having the failed status have been replaced, adjust one or more power limit values to original values.

5. The control unit of claim 1, the control unit adapted to:
determine if one or more of the power supply units having the failed status have been replaced; and
if the one or more power supply units having the failed status have been replaced, adjust an input power limit value of the first grid power source.

6. The control unit of claim 5, the control unit adapted to:
if the one or more power supply units having the failed status have been replaced, adjust an input power limit value of the second grid power source.

7. The control unit of claim 1, the control unit adapted to:
adjust the input power of the first grid power source based on data of input power relating to each of a plurality of power supply units in the computer server rack having a failed status; and
adjust the input power of the second grid power source based on the data of input power relating to each of the plurality of power supply units in the computer server rack having a failed status.

8. The control unit of claim 1, the control unit adapted to:
adjust an output power of the battery backup system.

9. One or more tangible, non-transitory machine readable media comprising a plurality of instructions that, in response to being executed on at least one processor of a computer server rack having a first grid power source, a second grid power source, and a battery backup system, cause the at least one processor to:
monitor a failed status of one or more power supply units in the computer server rack;
determine location information relating to the one or more power supply units having the failed status;
determine input power of the one or more power supply units having the failed status;
adjust an input power of the first grid power source based on the determined input power; and
adjust an input power of the second grid power source based on the determined input power.

10. The one or more tangible, non-transitory machine readable media of claim 9, comprising a plurality of instructions that, in response to being executed on at least one processor, cause the at least one processor to:
determine input power of the one or more power supply units having the failed status, wherein the determined input power of the one or more power supply units is an input power occurring prior to the failed status of the one or more power supply units.

11. The one or more tangible, non-transitory machine readable media of claim 9, comprising a plurality of instructions that, in response to being executed on at least one processor, cause the at least one processor to:
determine if one or more of the power supply units having the failed status have been replaced; and
if the one or more of the power supply units having the failed status have been replaced, adjust one or more power limit values to original values.

12. The one or more tangible, non-transitory machine readable media of claim 9, comprising a plurality of instructions that, in response to being executed on at least one processor, cause the at least one processor to:
determine if one or more of the power supply units having the failed status have been replaced; and
if the one or more power supply units having the failed status have been replaced, adjust an input power limit value of the first grid power source.

13. The one or more tangible, non-transitory machine readable media of claim 12, comprising a plurality of instructions that, in response to being executed on at least one processor, cause the at least one processor to:
if the one or more power supply units having the failed status have been replaced, adjust an input power limit value of the second grid power source.

14. The one or more tangible, non-transitory machine readable media of claim 9, comprising a plurality of instructions that, in response to being executed on at least one processor, cause the at least one processor to:
adjust the input power of the first grid power source based on data of input power relating to each of a plurality of power supply units in the computer server rack having a failed status; and
adjust the input power of the second grid power source based on the data of input power relating to each of the plurality of power supply units in the computer server rack having a failed status.

15. The one or more tangible, non-transitory machine readable media of claim 9, comprising a plurality of instructions that, in response to being executed on at least one processor, cause the at least one processor to:
adjust an output power of the battery backup system.

16. A method of controlling power in a computer server rack having a first grid power source, a second grid power source, and a battery backup system, comprising:
monitoring a failed status of one or more power supply units in the computer server rack;
determining location information relating to the one or more power supply units having the failed status;
determining input power of the one or more power supply units having the failed status;
adjusting an input power of the first grid power source based on the determined input power; and
adjusting an input power of the second grid power source based on the determined input power.

17. The method of claim 16, comprising determining input power of the one or more power supply units having the failed status, wherein the determined input power of the one or more power supply units is an input power occurring prior to the failed status of the one or more power supply units.

18. The method of claim 16, comprising:
determining if one or more of the power supply units having the failed status have been replaced; and
if the one or more of the power supply units having the failed status have been replaced, adjusting one or more power limit values to original values.

19. The method of claim 16, comprising:
determining if one or more of the power supply units having the failed status have been replaced; and
if the one or more power supply units having the failed status have been replaced, adjusting an input power limit value of the first grid power source.

20. The method of claim 19, comprising:
if the one or more power supply units having the failed status have been replaced, adjusting an input power limit value of the second grid power source.

21. The method of claim 16, comprising:
adjusting the input power of the first grid power source based on data of input power relating to each of a plurality of power supply units in the computer server rack having a failed status; and
adjusting the input power of the second grid power source based on the data of input power relating to each of the plurality of power supply units in the computer server rack having a failed status.

22. The method of claim 16, comprising:
adjusting an output power of the battery backup system.

23. A system comprising:
a computer server rack having a first grid power source, a second grid power source, and a battery backup system; and
a control unit configured to control the computer server rack and the battery backup system, the control unit adapted to:
monitor a failed status of one or more power supply units in the computer server rack;
determine location information relating to the one or more power supply units having the failed status;
determine input power of the one or more power supply units having the failed status;
adjust an input power of the first grid power source based on the determined input power; and
adjust an input power of the second grid power source based on the determined input power.

24. The system of claim 23, the control unit adapted to determine input power of the one or more power supply units having the failed status, wherein the determined input power of the one or more power supply units is an input power occurring prior to the failed status of the one or more power supply units.

25. The system of claim 23, the control unit adapted to:
determine if one or more of the power supply units having the failed status have been replaced; and
if the one or more of the power supply units having the failed status have been replaced, adjust one or more power limit values to original values.

* * * * *